March 24, 1936. J. E. FARRELL 2,035,307
AUTOMATIC SWITCH FOR ELECTRIC SERVICE LINES
Filed Oct. 18, 1934 2 Sheets-Sheet 1
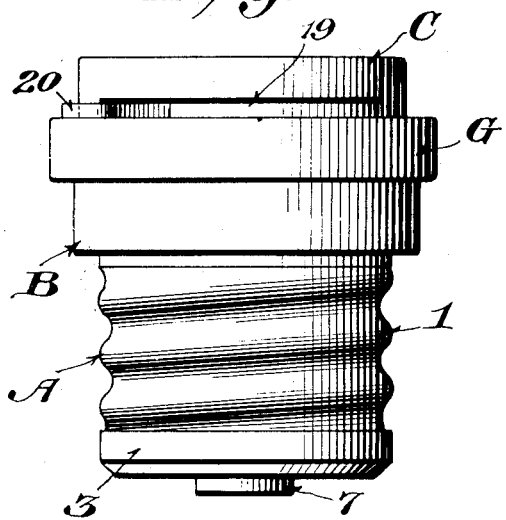
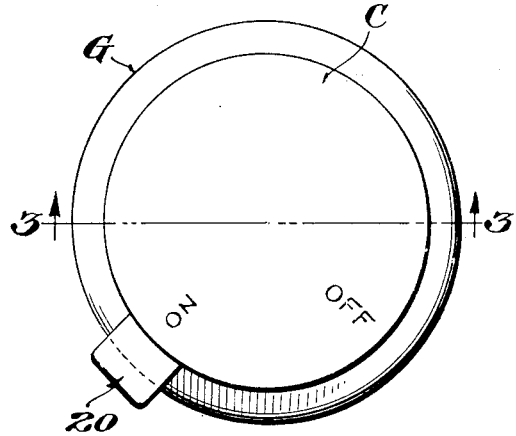
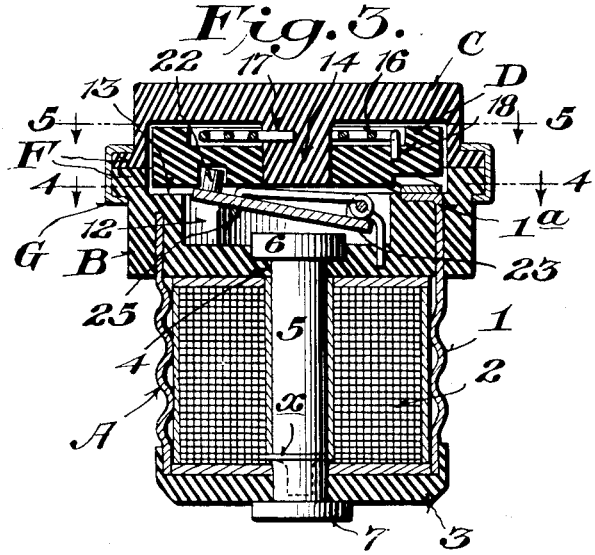
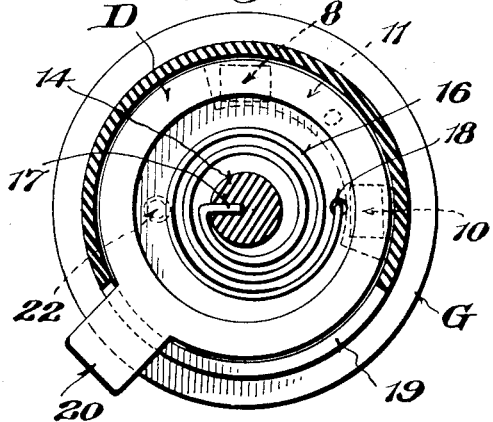
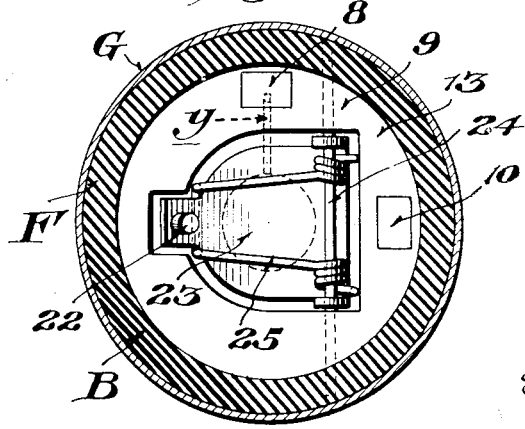
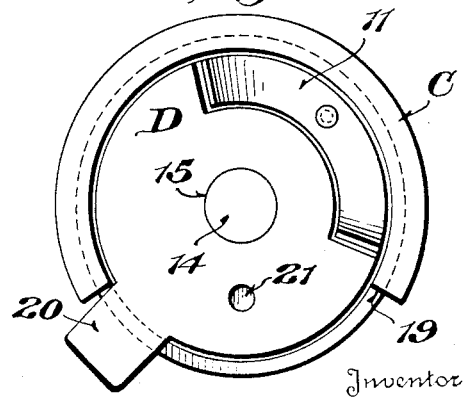
Inventor
Joseph E. Farrell,
By
Attorney

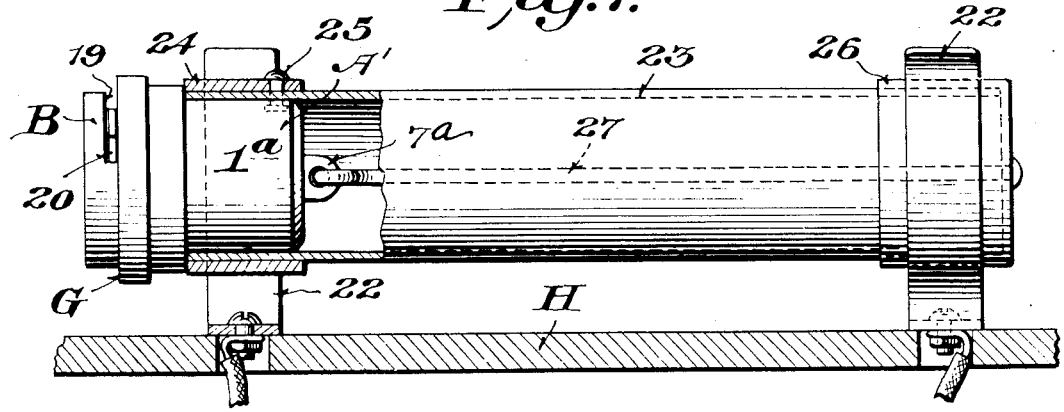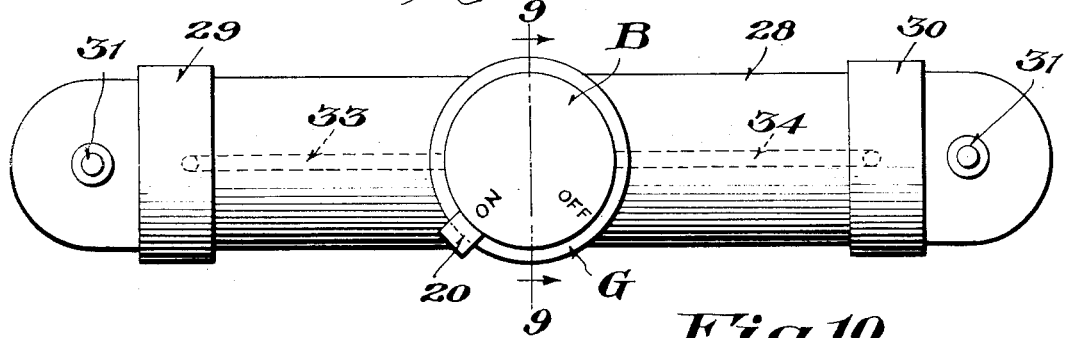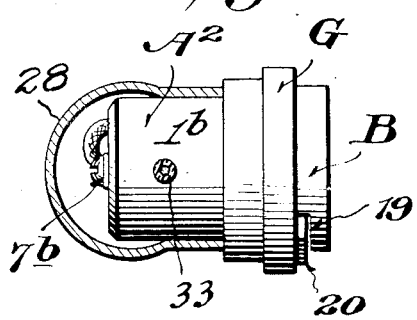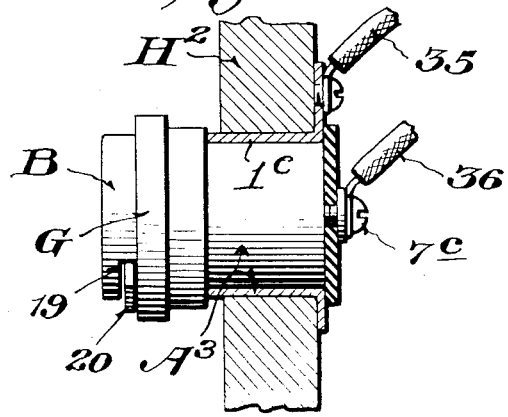

Patented Mar. 24, 1936

2,035,307

UNITED STATES PATENT OFFICE 2,035,307

AUTOMATIC SWITCH FOR ELECTRIC SERVICE LINES

Joseph E. Farrell, Washington, D. C., assignor to Automotive Devices Corporation, Washington, D. C., a corporation of Delaware Application October 18, 1934, Serial No. 748,958

11 Claims. (Cl. 200—106)

This invention relates to switches for automatically opening the circuit in electric power or light lines when an unusual condition, such as an overload or short circuit, occurs in the line for the purpose of protecting electrical units or apparatus included in the line circuit.

A special object of the invention is to provide a novel automatic electro-mechanical switch device adapted to be installed in an electric service power or lighting line to normally close the line circuit, but which automatically functions upon high voltage demand to open the circuit and keep it open until manually reclosed, by the simple operation of resetting the switch when the normal line conditions are restored. Thus, the invention distinguishes from so-called fuse devices employing a metallic strip which ruptures or breaks when high voltage occurs in the line and which must be discarded and replaced with a new device.

A primary object is to provide a device which may be used and re-used either in connection with existing installations or embodied in permanent panel board structure. In that connection the invention contemplates a novel structure, which by reason of its simplicity and compactness lends itself to numerous embodiments while at all times observing proper and adequate safeguards to both apparatus and personnel.

A more specific object of the invention is to provide a device having a novel supporting assembly which permits of the device being made with slight modifications to be mounted in a socket, or in a carrier of the cartridge type, or as an integral part of a control board or panel board, and which, upon the occurrence of an overload or a short in the line, will automatically open the circuit and cause the same to remain open until the switch is manually closed or reset.

Another object of the invention is to provide a device of the type including an electro-magnet which is activated upon the occurrence of the overload or short in the line to release an insulated spring biased switch member to open the circuit, so that when the circuit is open, the switch terminals are separated and protected by insulation so that even though the abnormal condition persists in the line, there is no danger of arcing or further shorting of the line. In other words the conductor element of the switch is removed to a safe position with respect to the switch terminals and is adequately insulated therefrom so that no air gap is possible and consequently an arc due to heavy voltage cannot build up in a dead air space.

A further object of the invention is to provide an automatic line switch of the magnetic type which is simple, practical and reliable in operation and which includes comparatively few parts arranged in a novel manner and which by reason of their simplicity not only facilitate manufacture and assembly but add materially to the service life of the device. Thus, the present device is far more economical from a maintenance standpoint than line protecting devices of the fusible metal type which must be frequently renewed at the expense of considerable time and labor as well as waste of material.

With the above and other objects in view which will become more fully apparent as the nature of the invention is better understood, the same consists in the novel construction, combination and arrangement of parts hereinafter more fully described, illustrated in the accompanying drawings, and defined in the appended claims.

A preferred and practical embodiment of the invention is shown in the accompany drawings, in which:—

Figure 1 is a side elevation of the improved automatic switch device carried by a screw base supporting assembly.

Figure 2 is a top plan view thereof.

Figure 3 is a vertical sectional view taken on the line 3—3 of Figure 2.

Figure 4 is a horizontal sectional view taken on the line 4—4 of Figure 3.

Figure 5 is a horizontal sectional view taken on the line 5—5 of Figure 3.

Figure 6 is a bottom plan view of the cap which includes a cover and the switch.

Figure 7 is a detail view illustrating the application of the invention to a panel having spring terminal clips previously used for supporting a fuse of the cartridge type.

Figure 8 is a view illustrating the adaptation of the invention to a panel having nut and screw type fastenings ordinarily used for supporting a fuse of the cartridge type having perforated ears.

Figure 9 is a detail vertical section taken on the line 9—9 of Figure 8.

Figure 10 is a detail sectional view of a portion of a panel illustrating a permanent installation of the present invention.

Similar reference characters designate corresponding parts throughout the several figures of the drawings.

According to the embodiment of the invention shown in the drawings, the same includes in its organization a supporting assembly designated generally as A, a switch base B, and a cap or cover structure also designated generally as C and which houses a switch member in the form of a disk D. It will thus be apparent that the invention includes a supporting and attaching assembly A and a surmounted novel switch structure and assembly B—C—D.

Referring first to the supporting assembly A it will be observed that the same comprises a metallic sleeve which may be in the form of a screw shell 1 forming one of the circuit terminals and intended to receive and house an electro-magnet 2 and having its lower end closed by an insulating plate or washer 3, or its equivalent, while its open end has fitted thereto the cup-like insulating switch base or block B having the central opening 4 and which will be later referred to more in detail. The plate 3 and switch base B are held together by a combined center plug contact or core member 5 which provides the other circuit terminal. The member 5 has a shouldered head portion 6 adapted to seat within a recess at the location of the opening 4 in the base and to pass through the hollow tube of the magnet 2 whereby its other end may receive a rivet or equivalent fastening 7. Thus, it will be apparent that the metallic shell 1, magnet 2 and parts 3 and B are held in assembled relation by the core member 5. The latter also, in cooperation with the rivet 7 provides a center plug contact as previously explained and is in circuit with the coil of the magnet, one end $x$ of the magnet winding being in contact with the core and the other end $y$ leading to a switch contact 8 imbedded in the interior shoulder 9 of the insulating switch base B. The metallic shell 1 may be provided with an extension 1$^a$ which is bent over or otherwise formed so as to be exposed at the upper face of the shoulder 9 thereby to constitute another switch terminal 10. It will therefore be apparent that when the supporting assembly A is fitted in an electrical service line socket, the circuit may be maintained through the magnet providing, of course, that the switch contacts 8 and 10 are bridged. If they are not bridged, naturally the circuit is open. For the purpose of maintaining the switch contacts 8 and 10 bridged under normal line conditions, the switch disk D having the terminal bridging the conductor 11 thereon is used.

As will be apparent from Figure 3, the insulating base B has an interior recess or cavity in which the shoulder 9 is located and which divides the cavity into an armature chamber 12 and a switch disk receiving chamber 13. The cover C and shiftable disk D are both made of insulating material as will be apparent from the drawings, and the cover C is provided with a central lug or post 14 for receiving the opening 15 in the disk D. Said disk carries on its under face the switch contact bridging conductor 11 previously referred to. As shown in Figure 3, the disk d operates within the cavity 13 when the cover and the disk are assembled on the switch base B, and the face of the disk next to the cover is recessed to house and accommodate a coil spring 16. One end of this spring is imbedded or otherwise anchored in the post 14 as indicated at 17 while the other end 18 is fixed to the disk. It will, therefore, be apparent that the disk D is spring biased with reference to the cover C which is held stationary on the base B as will hereinafter appear. One edge of the cover is provided with a slot 19 (Figures 5 and 6) for receiving a lever or handle 20 carried by the disk and which projects sufficiently beyond the cap structure to permit of manual engagement and to also serve as an indicator of signal in cooperation with "On" and "Off" legends on the outer surface of the cover C. The lower face of the disk, which also carries the conductor 11, is provided with a keeper recess 21 adapted to be engaged by the latch or lug 22 on an armature member 23 located in the chamber 12 above the head 6 of the core of the magnet. The armature member 23 is preferably pivotally supported on a member 24 imbedded in the side walls of the chamber 12 and is normally urged in an upward direction away from the head 6 of the magnet core by a spring 25.

Any suitable means may be utilized for holding the cover C and the supporting assembly A together. For example, the base B and the cover C may be provided with outwardly extending peripheral flanges F which may be engaged by a holding ring or other retaining element G.

When the device is assembled, as heretofore described and shown in the drawings, and providing that the lever or handle 20 is in the "On" position, shown in Figure 2, and the entire device is mounted in a socket included in a service line circuit, the parts will assume the position shown in Figures 3 and 5. The circuit through the magnet 2 will be completed because the conductor 11 on the switch disk bridges the switch contacts 8 and 10. The spring 25 which urges the armature member 23 upwardly will cause the lug 22 to engage in the notch or recess 21 of the disk and thus hold the disk biased in the "On" position under tension of the spring 16. When the service line is overloaded or a short occurs therein, the magnet will be supplied with an excess of current which will temporarily cause the armature 23 to be pulled downwardly against the tension of spring 25. Immediately upon the occurrence of this condition the disk 3 will be free to move under the influence of the spring 16 and will snap from the "On" position of Figure 2 to the "Off" position. In so doing, the conductor 11 carried by the disk will be moved out of bridging relation to and away from the switch contacts 8 and 10, thus opening the circuit through the device and also opening the circuit in the line which the device is intended to protect. If the short or overload in the line is only temporary, the armature 23 will be released by the magnet and the spring 25 will push the same upwardly. The lug or latch 22 will then simply bear against the underside of the disk D until the handle or lever 20 of the disk is pushed from the "Off" position to the "On" position. When this is accomplished the lug or latch 22 will again enter the recess 21 of the disk and hold the same in such a position that the conductor 11 will bridge the terminals 8 and 10. The current in the line will then be restored.

If the unusual condition in the line persists, it will of course be understood that it will be impossible to reset the disk D from the "Off" position to the "On" position due to the fact that, if the undesired condition still exists in the line at the time of resetting, the armature 23 will be pulled downwardly so that it will be impossible for the latch or lug 22 to enter the keeper recess 21 even though the disk is manually reset to its normal or proper position.

From the foregoing it will be apparent that the present invention includes a device having a supporting or attaching assembly A which includes the line terminals in the form of the metallic sleeve or shell 1 and the center contact 5 which are in circuit with the switch contacts 8 and 10 on the insulating base B. These contacts are bridged under normal conditions by the conductor 11 on the disk but when they are separated, the insulation of the disk constitutes a filler or barrier that prevents an air space existing between the two and consequently there can be no arcing between the contacts when the main circuit is broken.

When the switch maintains the circuit closed through the contact 9 and 10 and conductor 11 the circuit in the magnet coil is closed, and while the winding of the magnet is in circuit with the center contact 5 it is, of course, insulated from the metallic shell or sleeve 1.

By way of further illustrating the range of embodiment of the invention, reference may be made to Figures 7-10 inclusive showing its adaptation to terminal boards or panels employing different type main line terminals.

Referring first to Figure 7, it will be observed that a panel board H is shown having the spring terminal clips 22 for receiving, under ordinary circumstances, a fuse of the cartridge type. In this embodiment of the invention, the supporting assembly A' of the switch having all the features heretofore described may be fitted in one end of an insulating tube 23. The metallic terminal element 1ᵃ may be included in circuit with one of the ferrules 24 of the body by means of a fastening 25ᵃ or its equivalent. The center terminal 7ᵃ may be connected with the other metallic ferrule 26 by a conductor 27. The ferrules 24 and 26 are of course held by the spring clips of the line circuit. Thus, it will be apparent that the entire device may be readily mounted in a structure adapted for spanning spring terminal clips 22—22.

Figures 8 and 9 of the drawings illustrate a modification of the idea shown in Figure 7 wherein the insulated tube or cartridge like member 28 is provided at the ends with metallic ferrules 29 and 30 having perforated ears intended to receive binding terminals 31 on the panel board. In this arrangement the supporting assembly A² including the metallic circuit terminal 1ᵇ of the device may be connected by a conductor 33 with the metallic ferrule 29 while the center circuit terminal 7ᵇ may be connected with the other metallic ferrule 30 by conductor 34 to complete the circuit to the electro magnet of the device.

Figure 10 illustrates the application of the invention to a permanent panel board H². In this form the supporting assembly A³ including the metallic circuit terminal 1ᶜ may be permanently fitted to the board H². As shown, the metallic circuit terminal 1ᶜ may be permanently fitted to the board H² and a portion thereof connected with a line terminal as indicated at 35. Likewise, the center circuit terminal 7ᶜ may be connected with a line wire terminal 36. This view illustrates the application of the invention to a panel board which may be permanently installed with any desired number of devices according to the present invention necessary to meet the power or light requirements of a given installation. Since the present device does not have to be removed after it has once functioned, it is apparent that it may be readily made a part of a permanent panel board because it can be reset indefinitely after each functioning.

I claim:—

1. An automatic electric power line switch including an insulating switch base and stationary cover having a slot and surmounting a supporting assembly, said supporting assembly comprising a metallic shell at one side of the switch base, an insulating plate at the side of said shell opposite the base, an electromagnet housed within the shell between the base and the plate, a combined center plug contact and core member for the magnet and having means for securing the switch base and plate to the shell, a spring tensioned armature type latch located in the switch base, spaced switch contacts within the switch base and respectively included in circuit with the winding of the magnet and its core and with the shell, a post on the insulating cover, an insulating switch disk mounted on the post, a handle on the disk and projecting through the slot in the cover to limit the movement of the disk, a spring arranged between the disk and the inside face of the cover for tensioning the disk, keeper means on the disk adapted to cooperate with said armature member to hold the switch disk in normal set position, and a segmental conductor carried by the switch disk and adapted to engage and disengage said switch contacts.

2. An automatic electric power line switch including an insulating switch base having a central cavity, and an insulating cover secured together and surmounting a supporting assembly, said cover having a slot, and said supporting assembly comprising a metallic shell at one side of the base, an insulating plate at the side of the shell opposite the base, a magnet housed between the base and plate and within the shell, a core member constituting a center plug contact and passing through said magnet and having means for engaging the base and plate to hold them in assembled relation, a switch contact on the base in circuit with the screw shell, another switch contact on the base in circuit with the magnet and its core; a spring tensioned armature member having a lug and located in the cavity of the base, a post on said cover, an insulating disk mounted for movement on said post and having a socket for receiving said lug, a spring arranged between the disk and the cover member for tensioning the disk, a handle carried by the disk and projecting through said slot in the cover, and a conductor carried by the underside of the switch disk and adapted to engage and disengage said switch contacts on the base.

3. An automatic electric power line switch including an insulating switch base having a recess and an interior shoulder and a slotted cover secured to the base, a supporting assembly for the base and cover comprising a metallic shell at the side of the base opposite the shoulder, a pair of spaced switch contacts on said shoulder, one of said contacts in circuit with the shell, an electromagnet within the shell and having a portion of its winding connected to the other of said contacts, an insulating plate at the side of the magnet opposite the base, a core member for the magnet also constituting a center plug contact and having one end of the magnet winding connected thereto, means on the core member for holding the base and washer plate in assembled relation to the shell; a shiftable spring tensioned disk nested in the cover and having a handle projecting through the slotted portion thereof, keeper means on the disk, a conductor carried by the disk for making and breaking the circuit across said switch contacts, and a spring tensioned armature type latch pivotally supported in the recess of the switch base for engaging with said keeper means on the disk.

4. In an automatic electric power line protecting switch of the electro-magnetic type, a supporting assembly including a metallic shell housing, an electromagnet, an insulating switch base carried by the shell and having a recess, switch contacts on the base above the bottom of the recess, a spring tensioned armature type latch in the recess, and a cap including a slotted cover secured to the base and a switch disk of insulating material shiftably nested therein, said disk having a handle projecting through the slotted cover to limit the movement of the disk and also having keeper means for engaging with the said latch, a conductor on the disk for making and breaking the circuit across said contacts, and a spring for tensioning said disk.

5. In an automatic electric power line protecting switch of the electro-magnetic type, a pair of relatively flat disk-like insulating members surmounting a metallic shell, an electromagnet located entirely within said shell, means for securing said members together in fixed relation, one of said members having a latch recess and the other of said members having a depending side flange and a central post, an armature type latch mounted in said latch recess and disposed transversely of the axis of the electro-magnet, terminal contacts on the member having the recess, a spring-tensioned switch disk mounted on the post and housed by the depending side flange of the cover, an externally disposed operator carried by the switch disk, and a conductor carried by the underside of said disk for making and breaking the circuit across said terminal contacts.

6. In an automatic electric power line protecting switch of the electro-magnetic type, a pair of insulating members secured together and surmounting a plug assembly including a metallic shell which houses an electro-magnet, one of said members constituting a cover and having "On" and "Off" designations and also having a slot, spaced contacts on one of the members, an armature type latch carried by one of the members, and a shiftable spring tensioned insulating switch disk carried by the other of said members and controlled by the armature type latch, a handle on the said disk projecting through the slot and cooperating with the "On" and "Off" designations on the cover, and a conductor carried by the disk for making and breaking the circuit across said contacts.

7. In an automatic device for protecting electric service lines, a base, a spring tensioned latch electro-magnetically operated in one direction in the base, spaced switch contacts in the base, a cover fitted to the base and having a side wall provided with a slot, a spring tensioned switch disk nested within the side wall of the cover and having a handle projecting through the slot to limit the movement of the switch disk, and a conductor carried by said switch disk and adapted to make and break the circuit across said switch contacts within the limit of movement afforded by the handle of the disk operating in the slot of the cover.

8. In a device of the class described, an insulating base having spaced switch contacts thereon, a cover fitted to the base and having a side wall provided with a slot, an oscillatable spring tensioned disk having a conductor thereon and arranged within the cover, said disk having a handle projecting exteriorly of the cover through said slot to limit oscillatory movement of the disk with respect to the cover and the base whereby the conductor on the disk may connect and disconnect the switch contacts on the base, and electro-magnetic latch means for engaging and releasing the disk.

9. In a device of the class described, an insulating base, a cover fitted to the base and having a side wall provided with a slot, said cover cooperating directly with the base to provide a switch chamber, switch contacts on the base, a post on the inner side of the cover, an insulating disk mounted on the post and having a handle projecting through the slot in the side wall of the cover, a spring confined between the disk and the inside face of the cover for tensioning the disk within the limits provided by the handle of the disk operating in said slot of the cover, and electro-magnetically operated means for engaging and releasing the disk.

10. In an automatic electric power line protecting device, a plug portion comprising a screw shell, insulating members at opposite ends of the screw shell, a combined center plug contact and core member for clamping the insulating members to the screw shell, a winding surrounding said combined center plug contact and core member and having one end connected thereto, a switch contact on the plug portion connected with the other end of the winding of the magnet, a second switch contact on the plug portion connected with the said screw shell, latch means in the plug portion responsive to the magnetic field adapted to be generated in the combined core and center plug contact, a shallow cover for the plug portion, and a spring tensioned oscillatable switch disk of insulating material nested within the shallow cover and carrying a bridging contact adapted to make and break the circuit between said switch contacts, and means whereby said switch disk may be engaged and disengaged by said latch means.

11. An automatic switch device for protecting electric service lines comprising an assembly having a minimum length along its axis, said device including a plug base comprising a screw shell housing, an electro-magnet within the housing and having a core which constitutes the center contact of the plug; a latch disposed transversely of the axis of the core and pivotally supported in the plug base in position to be influenced by said electro-magnet, a shallow flanged cover for the plug base, and a flat spring-tensioned switch disk also lying transversely of the axis of the core of the electro-magnet and mounted within the shallow flanged cover and over the plug base, said disk having means adapted to be engaged and disengaged by said latch.

JOSEPH E. FARRELL.